United States Patent
Korpi et al.

(10) Patent No.: US 6,606,495 B1
(45) Date of Patent: Aug. 12, 2003

(54) METHOD AND ARRANGEMENT FOR WIRELESS COMMUNICATION BY MEANS OF AT LEAST TWO NETWORK COMPUTERS

(75) Inventors: Markku Korpi, Starnberg (DE); Stefan Karapetkov, Santa Clara, CA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/398,682

(22) Filed: Sep. 20, 1999

(30) Foreign Application Priority Data

Sep. 18, 1998 (DE) .......................... 198 42 851

(51) Int. Cl.$^7$ ................................ H04Q 7/20
(52) U.S. Cl. ........................ 455/432; 455/433
(58) Field of Search ................. 455/433, 432, 455/435, 413, 414, 415, 416, 417, 456, 426, 525, 552, 560

(56) References Cited

U.S. PATENT DOCUMENTS

| 5,839,076 A | * | 11/1998 | Becher ........................ 455/461 |
| 5,920,814 A | * | 7/1999 | Sawyer et al. ............... 455/422 |
| 6,101,387 A | * | 8/2000 | Granberg et al. ............ 455/433 |
| 6,223,055 B1 | * | 4/2001 | Cyr .............................. 455/555 |
| 2002/0132638 A1 | * | 9/2002 | Plahte et al. ................. 455/555 |

FOREIGN PATENT DOCUMENTS

WO  WO 96/18273  6/1996
WO  WO 97/42781  11/1997

* cited by examiner

*Primary Examiner*—Edward F. Urban
*Assistant Examiner*—Sheila Smith
(74) *Attorney, Agent, or Firm*—Staas & Halsey LLP

(57) ABSTRACT

An arrangement and a method with which wireless terminal devices which can usually be reached via a call number of one individual network computer can also be reached when they are located in the wireless communication area of a base station that is connected to another network computer. To this end, connection information is retrieved via a mobility server, and a connection setup to a corresponding network computer in whose radio area the wireless terminal device is located is controlled via that mobility server. The wireless terminal device delivers information, which is transmitted to the mobility server and from which, together with additional information from the network computer or the base station, this server is able to derive the information for the connection setup to the wireless terminal device. In order to limit the utilized network computers to only a switching function, performance features of the wireless terminal device are realized via a performance feature server, which controls the corresponding network computer via a CTI interface. The mobility servers are likewise connected to the respective network computers via a CTI interface. In this way, it is possible to realize private wireless communication networks with DECT functionality and with a large coverage, in which networks it is possible to reach wireless terminal devices at will, though they are dialed simply via the call number of a single network computer allocated to them.

11 Claims, 3 Drawing Sheets

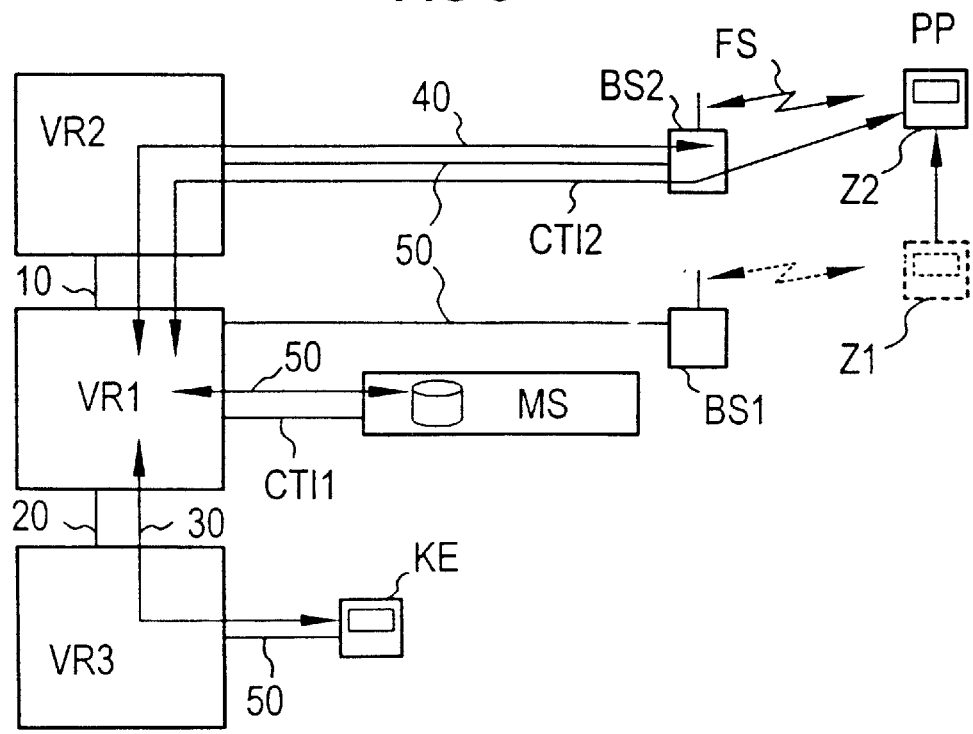
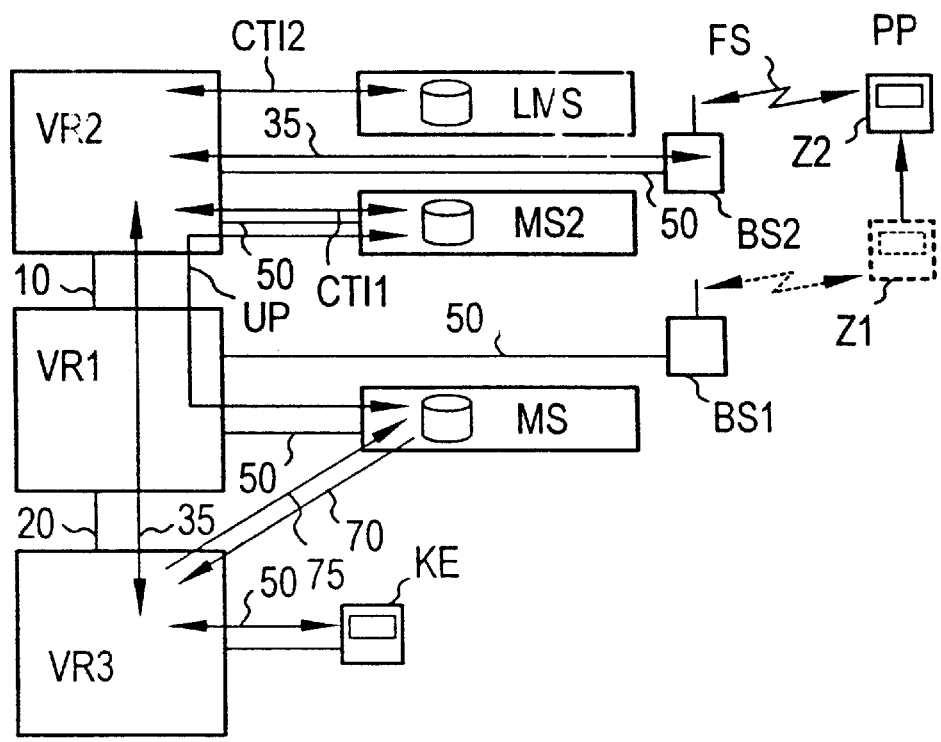

METHOD AND ARRANGEMENT FOR WIRELESS COMMUNICATION BY MEANS OF AT LEAST TWO NETWORK COMPUTERS

BACKGROUND OF THE INVENTION

The present invention relates to a method and an arrangement to provide a connection to a wireless terminal device depending on a location thereof such that, for the connection setup, a network computer is automatically contacted in whose wireless communication range the wireless terminal device currently resides, even if the connection code of another network computer has been entered by a communication subscriber that desires a connection to this wireless terminal device.

In recent years, wireless devices such as DECT telephones have gained ever wider acceptance in private networks. The DECT standard (Digital Enhanced Wireless Telephone) merely standardizes the air interfaces between a base station (Radio Fixed Part) and terminal device (portable part). Due to the often limited transmission power of wireless devices, their range of mobility is limited to the transmitting and receiving range of a respective base station. To expand the radius of activity of mobile devices of this type requires a number of base stations, whose wireless communication ranges mutually overlap or at least adjoin one another. To cover very large surface areas for the wireless communication, such as are represented by expanded industrial parks or cities, it is frequently necessary to provide base stations at a variety of network computers, in order to have available a sufficiently large wireless communication range for applications of this kind. The system structure of communication arrangements such as this and the communication methods used must guarantee that, given the moving of a wireless terminal device through the various wireless communication areas, it is assured that problems involving the stability of the connection do not arise in the wireless communication in the transition between these communication areas. This wandering thorough different wireless communication areas is known as roaming in the professional jargon. In particular, given roaming of this kind, it must be guaranteed that a wireless terminal device which is normally reachable via a communication code in the form of a telephone number, which switches a connection through to this device via a specific network computer, is also reachable if it is located in the wireless communication region of the base station of another network computer which can be reached via a different telephone number. This problem is solved in a communication system of the HICOM 300 type, currently marketed by Siemens AG, by a specific assembly that is present in each network computer. This assembly guarantees by network-wide communication that a wireless terminal device can roam arbitrarily.

But it is desirable in the sense of a universal usability of network computers to store functions other than pure switching functions externally to the computer and to establish auxiliary functions in the sense of a client-server concept.

SUMMARY OF THE INVENTION

An object of the present invention is to provide a method and an arrangement which combine the usability of optimally universal network computers, which execute pure switching functions only, with the required functions for the wide-area roaming of wireless terminal devices.

This object is achieved in accordance with the invention in a method wherein it is determined, via a mobility server having wireless connection information about a first wireless terminal device, having a first communication code for enabling a communication connection to a first network computer, whether the first wireless terminal device is located in a first wireless communication area of the first network computer. A wireless connection of said first wireless terminal device is set up to the first network computer upon determining that the first wireless terminal device is located in the first wireless communication area. A wireless connection of the first wireless terminal device is set up to the first network computer via a second network computer, having a second wireless communication area within which the first wireless-terminal device is located, using the wireless connection information, upon determining the first wireless terminal device not being located in the said first wireless communication area.

In an embodiment of the inventive method, wireless connection information for a wireless terminal device is advantageously held ready in a mobility server, and a connection to the wireless terminal device is produced by means of this wireless connection information. In this way, it is possible to use universal network computers, and the wireless terminal device can still be reached via that computer in whose wireless communication region it is located, even if a communication subscriber who wishes to establish the connection to this wireless terminal device dials the number of a different network computer.

In an embodiment of the inventive method, the mobility server advantageously controls the setup of the wireless connection by means of the connection information, because it is possible in this way to use standard interfaces for the influencing of the switching process on the network computer, and because the technical outlay for implementing the method is kept low.

In an embodiment of the inventive method, an item of identification information is delivered by the wireless terminal device, which can be received by a base station at a respective network computer. In this way it can be guaranteed that a connection message can be generated by simple means, via which connection message the network computer via whose communication code this wireless terminal device can usually be reached learns the connection path via which a connection to the wireless terminal device can be currently set up.

In an embodiment of the inventive method, the wireless connection information in the mobility server is advantageously updated with the aid of the connection message that has been forwarded by one network computer to another network computer. This guarantees, in a technically and constructionally simple manner, the constant reachability of the wireless terminal device, regardless of its location.

In an embodiment of the inventive method, performance features of the respective wireless terminal device are advantageously loaded in a performance feature server, which controls the network computer depending on activated performance features. This enables use of standardized interfaces to control network computers. Further, the outlay for implementing the displaying of performance features on wireless terminal devices remains low, wherein it is possible at the same time to use universal network computers which execute switching functions only.

In an embodiment of the inventive method, a check is advantageously made, prior to the setup of a connection to the wireless terminal device, as to whether a performance feature has been activated which renders the connection setup to this wireless terminal device superfluous, such as call forwarding to a secretary or the activation of a mailbox (which can be realized in the respective home network computer). The connection request and the communication line which transmits this connection request arrive thereat. On the one hand, this prevents the network load from increasing due to the setup of unneeded connections, and on the other hand, it guarantees a high flexibility with reference to the use of a wide variety of performance features.

In an embodiment of the inventive method, different network computers whose wireless communication areas border one another are advantageously combined into a group. In this way unrestricted movement of the wireless terminal equipment within the wireless communication areas of these network computers is possible. The method also guarantees that the wireless terminal device can be reached at all times. This method also enables the establishment of private and public wireless communication areas of arbitrary size.

In an embodiment, an arrangement comprising at least two network computers that are connected to each other; a mobility server, which is connected to a network computer, contains connection information to a wireless terminal device; and a wireless terminal device. This arrangement represents the minimal configuration with which the object of the invention is achieved and with which the ability to reach the wireless terminal device via the setup of a connection by means of the mobility server is guaranteed. This arrangement is attractive, because it solves the problem of the invention using technically simple means.

In an embodiment of the inventive arrangement, means are provided for delivering identity information and for receiving such information as delivered by the wireless terminal device, from which information, in connection with connection information of the respective network computer, additional means generate a connection message, which can be forwarded to other network computers and which guarantees the reachability of the wireless terminal device. This arrangement and these means easily guarantee the reachability of the wireless terminal device within a wide variety of wireless communication areas of different network computers, via a single communication code of a home network computer of this wireless terminal device.

In an embodiment of the inventive arrangement, there is a performance feature server, which makes available a wide variety of performance features for the wireless terminal device and which controls the network computer depending on these performance features. In this way, it is possible to use network computers which only have switching functions, and at the same time to realize and display a wide variety of performance features for the wireless terminal devices, thereby making available a highly flexible universally usable communication arrangement.

These and other features of the invention(s) will become clearer with reference to the following detailed description of the presently preferred embodiments and accompanied drawings.

DESCRIPTION OF THE DRAWINGS

FIG. 3 is a schematic block diagram of a communication arrangement having the mobility server at a network computer and the performance feature server in the wireless terminal device.

FIG. 4 is a schematic block diagram of a communication arrangement having two mobility servers and one performance feature sever.

DETAILED DESCRIPTION OF THE PRESENTLY PREFERRED EMBODIMENTS

Figure 1:
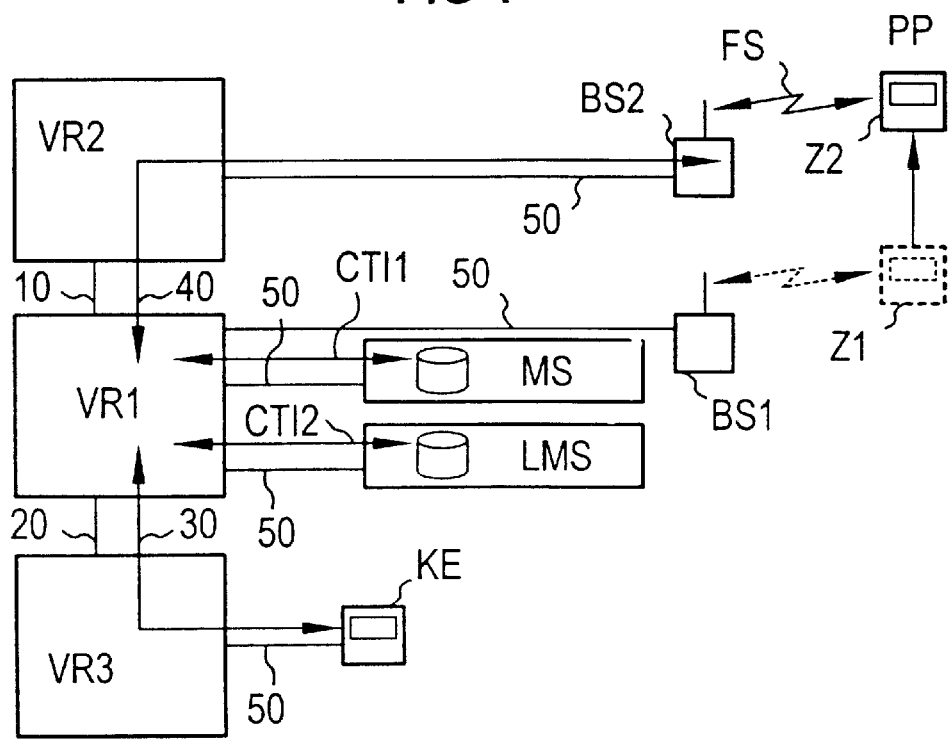
FIG. 1 is a schematic block diagram of a first embodiment of a communication arrangement having a performance feature server and a mobility server at the same network computer.

FIG. 1 depicts a first communication arrangement with network computers VR1 to VR3, a performance feature server LMS, a mobility server MS, a wireless terminal device PP, and base stations BS1 and BS2, which are connected to the respective network computers VR1 to VR3 and which comprise the wireless communication areas Z1 and Z2, in which it is possible to establish a radio connection FS. In addition, a communication terminal device KE is illustrated, which sets up a communication connection to the wireless terminal device PP. This communication terminal device KE can be a matter not only of a wireless terminal device, but also of a wirebound terminal device. Connections 10 to 40 as well as CTI1 and CTI2 are provided between the individual components of these communication arrangements.

As mentioned above, it should be possible to utilize optimally universally usable network computers VR1 to VR3 which executed pure switching functions. In this case, the wireless terminal device PP can be reached at the network computer VR2 in that a port extension to the base station BS2 from the network computer VR1 is performed. The following occurs in the connection setup to the wireless terminal device PP: From the communication terminal device KE, a communication code for the wireless terminal device PP is inputted, which usually secures the reachability of PP via the network computer VR1 and the base station BS1. The connection request of KE now reaches the network computer VR1 on 30. There, the mobility server MS is interrogated with respect to the wireless connection information of PP via the connection line 50. It emerges that PP is not located in the wireless communication area of VR1 at the moment, but is located in the wireless communication area of VR2 and can be reached via the base station BS2 in the wireless communication area Z2. The network computer VR1 sets up the connection to VR2 via 40 and 50 to BS2, under the control of the mobility server MS. A-connection from KE reaches the network computers (switching computers) VR1 and VR2, for example private branch exchanges, via a public network computer VR3 . A connection may thus be set up transparently by the network computers VR1 and VR2. The connection setup is controlled by the wireless connection information, which is held ready in the mobility server MS. The network computer is preferably controlled via the standardized interface for computer telephone integration (CTI). Here, the connections from the mobility server MS and from the performance feature server LMS are referenced CTI1 and CTI2. CTI is a matter of a general term for the communication between computer and network computer. The most popular standard for CTI is CSTA (Computer Supported Telecommunications Applications). But there are also proprietary solutions, such as ACL (Application Connectivity Link). Preferably, it is possible to control all the network computers present in a respective communication arrangement via interfaces of the same type by means of the respective server. This guarantees that compatibility problems do not arise in the transition from one network computer to another or given the presence of a number of servers. Identity information is preferably delivered by the wireless terminal device PP and forwarded—here, to the base station BS2—via the radio path FS. The network computer VR2 sends this identity information, together with its own connection data, to other network computers in the form of a connection message; in this case to VR1, which can use this connection message to update the wireless connection information in its mobility servers MS. For example, this case can arise when the wireless terminal device PP changes from one wireless communication area Z1, of the base station BS1 and the network computer VR1, to a wireless communication area Z2, of the base station BS2 and the network computer VR2. The connection message and the wireless connection information in the mobility server MS can be compared cyclically, and if a discrepancy arises, the current information can be entered in the mobility server MS. Performance features for PP are made available by the performance feature server LMS, which is connected to VR1 via the interface CTI2. Such performance features can contain call forwarding, the activation of a mailbox, or the displaying of toll units, for example. Depending on activated performance features, it can be ensured by an appropriate procedure that, for example, a port extension is not activated if a call forwarding or the activation of a mailbox has been switched on. For this purpose, performance features are checked by the proposed method in a prioritized manner, and only such wireless connections are set up whose setup does not conflict with activated performance features.

The arrangement in FIG. 1 makes possible extension connections in the form of a port extension, a call extension or a prolonging connection. Home services of the network computer VR1 are thus also available to other network computers, such as the network computer VR2. This type of arrangement offers an added advantage, since it is possible to use keyboard protocols or stimulus protocols that are simple and easy to realize for the controlling of the wireless terminal devices PP in conjunction with the performance feature server LMS. The IPUI (International Portable User Identity) or respectively its call number, can be used as the identity information in the wireless terminal device PP, for example. Depending on the case, additional data can also be contained in a user profile, which data can be filed in a database on the mobility server MS. In this way, a high flexibility is achieved with reference to the connection message to be transmitted, and the comparison process between the stored wireless connection information and the connection message is configured so as to be simple and flexible. Also, in case the wireless terminal device PP is not located in the wireless communication area Z2 of the base station BS2 of the network computer VR2, as it is here, but rather in the wireless communication area Z1 of the base station BS1 at the network computer VR1, then the setup of the wireless connection to PP by the network computer VR1 is controlled by the mobility server MS via the wireless connection information.

Figure 2:
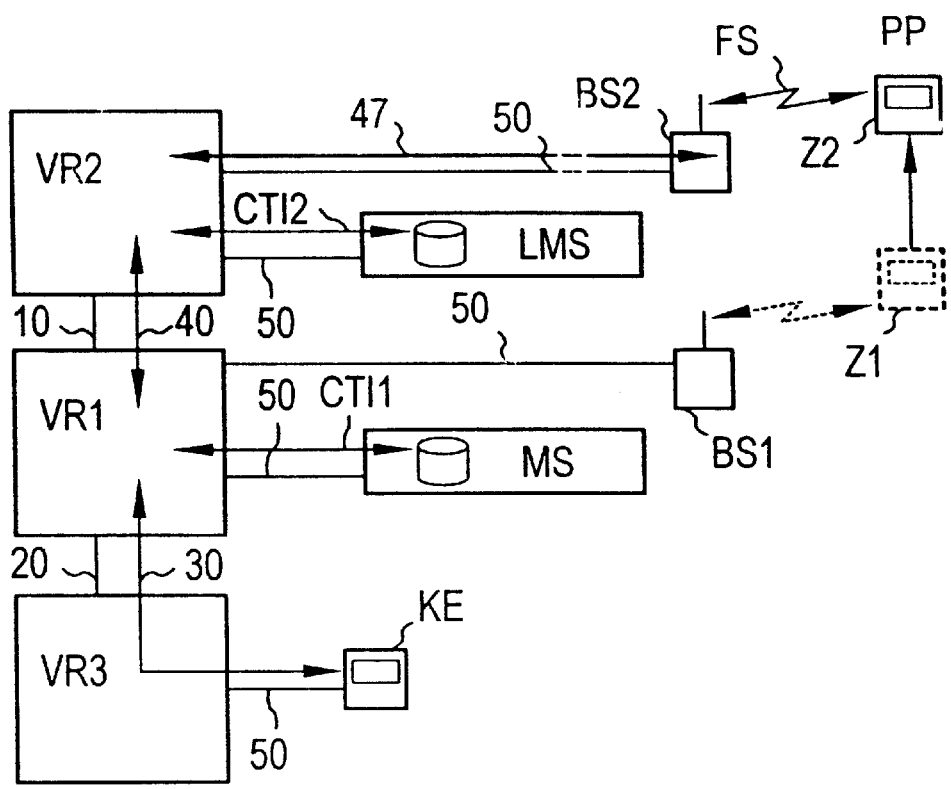
FIG. 2 is a schematic block diagram of a second embodiment of a communication arrangement having the performance feature server at one network computer and the mobility server at another network computer.

As FIG. 2 shows, in contrast to FIG. 1, the performance feature server LMS can also be connected to the network computer VR2 via the interface CTI2. In this case, it is likewise assumed that the communication subscriber can be reached at the wireless terminal device PP via the network computer VR1. The wireless connection information is made available by the mobility server MS, which is connected at the network computer VR1 via the interface CTI1. In this regard, it is noted that all reference characters that are the same relate to components of the arrangement with the same function throughout the different Figures.

By means of the wireless connection information, a call for the wireless terminal device PP coming in at the network computer VR1 is extended by the mobility server MS to the destination (here the destination is VR2). Also, calls going out of the wireless terminal device PP are first connected through to the network computer VR1 via connections 47 and 40 and are then routed to the requested destination. The incoming/outgoing calls in the network computer VR are thus switched in the performance feature server LMS or in the mobility server MS. Only signaling information such as the destination address is transmitted to the mobility server MS, whereby the CTI interface is preferably used. Using this destination address, the mobility server MS can then ascertain—namely, by comparing the stored data—whether the wireless terminal device PP is located in the wireless communication area Z1 or in the wireless communication area Z2. In either case, the mobility server MS prompts the network computer to set up a connection to the wireless terminal device PP. Unlike in the arrangement illustrated in FIG. 1, the performance features of the wireless terminal device PP are made available by a performance feature server LMS that is connected to the network computer VR2.

Since performance feature servers LMS which are connected to different network computers VR1, VR2 may differ with respect to the loaded and available performance features, it is possible for different performance features to be available within the wireless communication area Z1 and within the wireless communication area Z2. This is true only if, in contrast to the illustration in FIG. 2, a respective performance feature server LMS is connected to the different network computers VR1, VR2, and the respective performance feature servers make a different spectrum of performance features available to the different network computers VR1 ,VR2.

FIG. 3 illustrates another arrangement for wireless communication by means of two network computers VR1, VR2, in which arrangement the performance feature server is integrated in the wireless terminal device PP. Once the mobility server MS is additionally connected at the network computer VR1, for incoming calls from KE (one such call is referenced 30 here), an extension is accordingly executed from this network computer VR1 to the corresponding network computer (here VR2), according to the wireless connection information in the mobility server MS. In the arrangement illustrated here, the information about performance features of the wireless terminal device PP is transmitted to the wireless terminal device PP via an extension connection port extension CTI2, which runs through the base station BS2. In this case, the wireless terminal device PP must be intelligent enough to convert the information via CTI and to control the network computer VR1 in accordance with specific performance features. It is noted that the connection path CTI2 represents only one logical connection and does not symbolize two radio pathways, as might be mistakenly derived from the illustration. The connection CTI2 can be contained in the radio pathway FS, accordingly.

As FIG. 4 illustrates, other arrangements are provided in other communication networks which support call rerouting instead of port extension. Two mobility servers MS and MS2 are used in this case. In this arrangement, for incoming calls from communication terminal device KE, the wireless connection information in MS is interrogated via trunk lines 70 and 75, bypassing the network computer VR1, and a connection is switched through directly from the network computer VR3 to VR2, bypassing VR1. This connection is referenced 35 in FIG. 4.

In this case, the network computer VR2 is controlled by the mobility server MS2, which likewise makes available the wireless connection information. This forwards the call via 35 to the base station BS2, and via this to the wireless terminal device PP. Here, information about the performance features of the wireless terminal device PP is forwarded to the performance feature server LMS from the network computer VR2 via CTI2. According to the performance features which are updated and are to be loaded, LMS controls the network computer VR2 and thus specifies which performance features can be realized at the wireless terminal device PP. Because a connection extension to the network computer VR1 does not ensue in this case, only such performance features can be activated from the wireless terminal device PP as are provided in the performance feature server LMS. For this reason, it can be provided that only such performance features as can be activated via LMS are displayed at the wireless terminal device PP. For the case when, as depicted here, a number of mobility servers MS and MS2 are present, updates of the wireless connection data/information in the mobility servers MS and MS2 can be executed cyclically. This situation is indicated via a connection UP between MS2 and MS. For the updating of the wireless connection information on the mobility servers MS and MS2, standard protocols MAP (Mobile Application Protocol) or CTM (Wireless Telephone Mobility) can be used.

Figure 5:
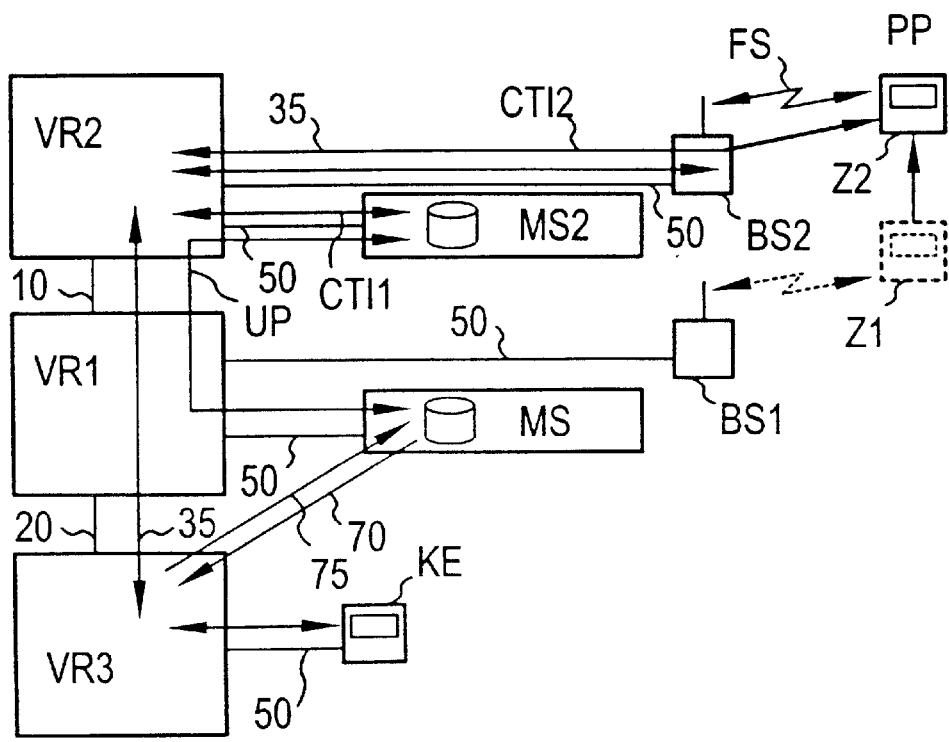
FIG. 5 is a schematic block diagram of a communication arrangement having two mobility servers and a performance server in the wireless terminal device.

Analogous to the illustration in FIG. 3, FIG. 5 illustrates the case in which the performance feature server is realized in the wireless terminal device PP. This can be applied to the case where the network does not support port extension, but rerouting. In the setup of the connection and in the updating of the mobility server MS, MS2, the same ideas apply as were outlined in the arrangement in FIG. 4. But with respect to the performance features available on the wireless terminal device PP, it is guaranteed in this case that the wireless terminal device PP has available to it the same performance feature spectrum in every wireless communication area of every network computer VR1, VR2, VR3, because the performance feature server is integrated in the wireless terminal device, and the performance features are controlled in the network computer VR2 by the wireless terminal device via CTI2. It is particularly important in this case that all network computers VR1, VR2, VR3 support the same CTI protocol, since otherwise the control of the performance features may or may not function on the various network computers VR1, VR2, VR3. As is illustrated here, in the case of such an arrangement, no additional performance feature servers of any kind are needed in the entire network, since the wireless terminal device PP carries the performance feature server with it.

Figure 6:
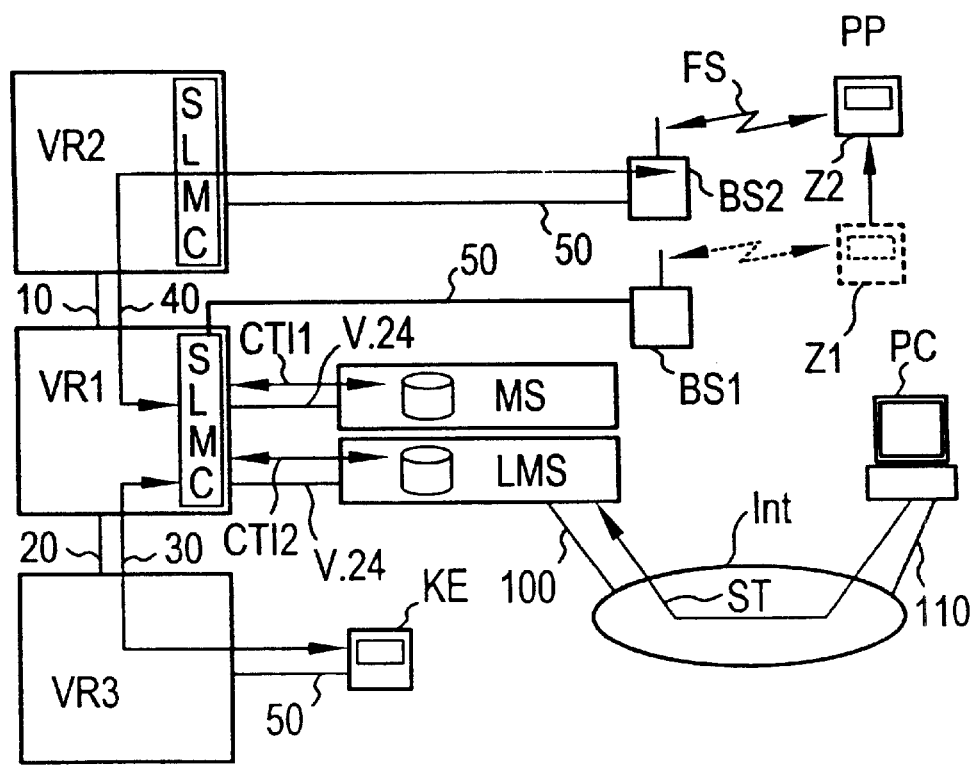
FIG. 6 is a schematic block diagram of an arrangement having a performance feature server and mobility server at a network computer.

As is illustrated in FIG. 6, a technical realization of the invention is realized in a conventional communication system using a standard assembly SLMC, for example. In this specific case, the mobility functions and the performance features are controlled by one mobility server MS and one performance feature server LMS via CTI interfaces CTI1 and CTI2 at the assembly SLMC. This assembly then takes over the setup of the port extension to another network computer only according to the wireless connection information in the mobility server MS (the extension is illustrated here as connection 40 to the network computer VR2). As illustrated here, the CTI interface can be realized via a V.24 connection, which is typically already present at the network computer VR1. For sending electronic mail and for transmitting fax messages, a computer PC can be interfaced via data lines 210 to a data network INT, which is interfaced to the performance feature server LMS via another line 100. The loading of performance features onto LMS can likewise be controlled by the computer via ST.

Although modifications and changes may be suggested by those of ordinary skill in the art, it is the intention of the inventors to embody within the patent warranted hereon all changes and modifications as reasonably and properly come within the scope of their contribution to the art.

We claim as our invention:

1. A method for wireless communication via at least two private branch exchanges, said method comprising:

determining via a mobility server having wireless connection information about a first wireless terminal device and having a first communication code for enabling a communication connection to a first private branch exchange, whether said first wireless terminal device is located in a first wireless communication area of said first private branch exchange, setting up a wireless connection of said first wireless terminal device to said first private branch exchange upon determining said first wireless terminal device is located in said first wireless communication area; and setting up a wireless connection of said first wireless terminal device via a second private branch exchange, having a second wireless communication area, using said wireless connection information, upon determining said first wireless terminal device not being located in said first wireless communication area and being located in said second wireless communication area;

providing performance features for said first wireless terminal device from a performance feature server being connected to the first private branch exchange via a CTI-interface, said performance features being activable; and controlling the first private branch exchange via said performance feature server in accordance with an activated performance feature.

2. The method according to claim 1, wherein said setting up of said wireless connection to said first network computer is controlled by said mobility server with said aid of said wireless connection information.

3. The method according to claim 1, further comprising the steps of:

delivering identity information from said first wireless terminal device, said identity information being a component of said wireless connection information;

receiving said identity information at a second wireless base station connected to said second network computer; and transmitting a connection message comprising said identity information together with said wireless connection information from said second network computer to at least another network computer connected to a first wireless base station.

4. The method according to claim 3, further comprising the steps of:

receiving said connection message at at least one mobility server;

updating said wireless connection information at said mobility server; and setting up a wireless connection to said base station at said second network computer when a network computer to which said mobility server being connected receives said first communication code.

5. The method according to claim 1, further comprising the steps of:

determining, prior to a setup of a wireless connection to said wireless terminal device, whether an activated performance feature renders said connection setup to said first wireless terminal device superfluous; and executing said performance feature in a prioritized manner upon determining said connection setup being superfluous.

6. The method according to claim 1, further comprising the step of:

forming a wireless communication group of a limited number of network computers having wireless communication areas at least bordering one another and within which said connection message is transmitted.

7. An arrangement for wireless communication, said arrangement comprising:

a wireless terminal device;

at least one first private branch exchange having a first wireless communication area in which it is possible to communicatively reach said wireless terminal device;

a performance feature server connected to the first private branch exchange;

a second private branch exchange connected to said first private branch exchange and having a second wireless communication area in which it is possible to communicatively reach said wireless terminal device; and a mobility server connectable to said first and second private branch exchanges and having wireless connection information for the wireless terminal device and for controlling a setup of a connection via one of said first and second private branch exchanges to said wireless terminal device according to said wireless connection information such that when the wireless terminal device is in the second communication area, the performance feature server controls the first private branch exchange to provide requested services to the wireless terminal device through the second private branch exchange.

8. The arrangement as claimed in claim 7, wherein said wireless terminal device further comprises an identifier for delivering an identity information; and said arrangement further comprising:

a locator for ascertaining a location of said wireless terminal device in said first and second wireless communication areas;

a message generator for generating a connection message dependent on said first or second wireless communication area being ascertained by said locator and on said identity information; and a message distributor for delivering said connection message to at least an other of said first and second network computers.

9. The arrangement as claimed in claim 7, further comprising:

a performance feature server connectable to said first and second network computers and for controlling said first and second network computers dependent on a performance feature to be loaded for said wireless terminal device.

10. The arrangement as claimed in claim 7, wherein there are a plurality of wireless terminal devices and the mobility server has connection information for each of the wireless terminal devices.

11. A system for wireless communication, said system comprising:

a wireless terminal device;

a first network computer having a first wireless communication area in which it is possible to communicatively reach said wireless terminal device;

a performance feature server connected to the first network computer;

a second network computer connected to said first network computer and having a second wireless communication area in which it is possible to communicatively reach said wireless terminal device; and a mobility server connectable to said first and second network computers and having wireless connection information for the wireless terminal device and for controlling a setup of a connection via one of said first and second network computers to said wireless terminal device according to said wireless connection information such that when the wireless terminal device is in the second communication area, the performance feature server controls the first network computer to provide requested services to the wireless terminal device through the second network computer.

* * * * *